United States Patent [19]

Hamada et al.

[11] Patent Number: 4,972,075
[45] Date of Patent: Nov. 20, 1990

[54] AUTOMATIC FOCUSING SYSTEM WITH DUAL DIFFRACTION GRATINGS AND CONVERGING MEANS

[75] Inventors: Akiyoshi Hamada; Mitsutoshi Yagoto; Masanori Murakami, all of Osaka, Japan

[73] Assignee: Minolta Camera Kabushiki Kaisha, Osaka, Japan

[21] Appl. No.: 388,013

[22] Filed: Jul. 31, 1989

[30] Foreign Application Priority Data

| Aug. 2, 1988 | [JP] | Japan | 63-193147 |
| Dec. 9, 1988 | [JP] | Japan | 63-227981 |
| Dec. 16, 1988 | [JP] | Japan | 63-317746 |
| Dec. 22, 1988 | [JP] | Japan | 63-324020 |

[51] Int. Cl.$^5$ ............................................. G01J 1/20
[52] U.S. Cl. .............................. 250/201.5; 369/44.23
[58] Field of Search .................... 250/201.5, 202; 369/44.23

[56] References Cited

U.S. PATENT DOCUMENTS

| 4,475,182 | 10/1984 | Hosaka | 369/46 |
| 4,503,324 | 3/1985 | Yokota | 250/201 |
| 4,651,314 | 3/1987 | Yoshikawa et al. | 250/201 |
| 4,850,673 | 7/1989 | Velzel et al. | 369/44.23 |
| 4,858,215 | 8/1989 | Yano et al. | 250/201.5 |

FOREIGN PATENT DOCUMENTS 253442 1/1988 European Pat. Off.
3531579 3/1986 Fed. Rep. of Germany.

OTHER PUBLICATIONS

Applied Optics, vol. 13, No. 6, Jun. 1974, pp. 1322-1326: "Focusing Errors in a Collimating Lens or Mirror: Use of a Moire Technique", Fouere et al.

Primary Examiner—David C. Nelms
Attorney, Agent, or Firm—Price, Gess & Ubell

[57] ABSTRACT

An automatic focusing system for forcusing on an optical disk, the system including a laser beam source, an objective lens, a photodetector for detecting a focusing error, a beam splitter disposed between the laser beam source and the objective lens and a pair of diffraction gratings disposed between the beam splitter and the photodetector means so as to form a moiré pattern on the photodetector means. The laser beam produced from the laser beam source travels to the optical disk through the objective lens and then is reflected off the optical back through the objective lens travels to the photodetector. A converging lens may be disposed between the beam splitter and the gratings or between the two gratings. Further, a single optical member may be constituted so as to form a moiré pattern on the photodetector. The optical member includes a transparent base plate for supporting the two gratings on the respective surfaces thereof. Also, in the case where a converging lens is disposed between the two gratings, the two gratings may be provided on the respective surfaces of the lens.

11 Claims, 13 Drawing Sheets

AUTOMATIC FOCUSING SYSTEM WITH DUAL DIFFRACTION GRATINGS AND CONVERGING MEANS

CROSS REFERENCE TO RELATED APPLICATION

A related copending application of particular interest to the present application is United States Ser. No. 169,420, entitled "Automatic Focusing Appratus," filed on Mar. 17, 1988, now abandoned and assigned to the same assignee as the present application.

BACKGROUND OF THE INVENTION

1. Field of the Invention

The present invention relates to automatic focusing systems for use in optical pickup devices for scanning optical discs, for example. More particularly, the present invention relates to an automatic focusing system for carrying out a focusing operation by utilizing a moire image.

2. Description of the Related Art

In general, optical pickup devices for picking up information from optical discs are provided with an automatic focusing system to carry out a focusing operation.

For example, European Patent Publication No. 253,442 discloses a focusing system which detects focusing errors by means of a pair of diffraction gratings. In the system disclosed in the publication, the diffraction gratings are arranged one behind the other in a path of beam between an optical disc and a detection means so that the grating strips of one grating intersect those of the other grating at a small angle. Such an arrangement forms a moire pattern of bright and dark bands on the detection system. Since the moire pattern rotates according to the variation of the beam divergence, a focusing error can be detected by measuring the rotation of the moire pattern.

However, the focusing system disclosed in the publication has the problem of failing to detect focusing errors with a high precision because the amount of light received by the detection system greatly differs between in-focus condition and out-focus condition. Moreover, since the diffraction gratings must be arranged very accurately relative to each other in order to form a moire pattern, higher accuracy is required in manufacturing the system, thereby entailing a higher cost. Additionally, the focusing system still remains to be fully compacted.

SUMMARY OF THE INVENTION

Accordingly, the primary object of the present invention is to provide an automatic focusing system adapted to detect focusing errors with a high precision utilizing a moire pattern.

Another object of the present invention is to provide an automatic focusing system wherein a pair of diffraction gratings can be arranged readily to form a moire pattern and which is easy to manufacture.

Another object of the present invention is to provide an automatic focusing system having a compact structure and utilizing a moire pattern.

BRIEF DESCRIPTION OF THE DRAWINGS

These and other objects or features of the present invention will become apparent from the following description of the preferred embodiments thereof taken in conjunction with the accompanying drawings, in which.

In the following description, like parts are designated by like reference numbers throughout the several drawings.

DESCRIPTION OF THE PREFERRED EMBODIMENTS

Figure 1:
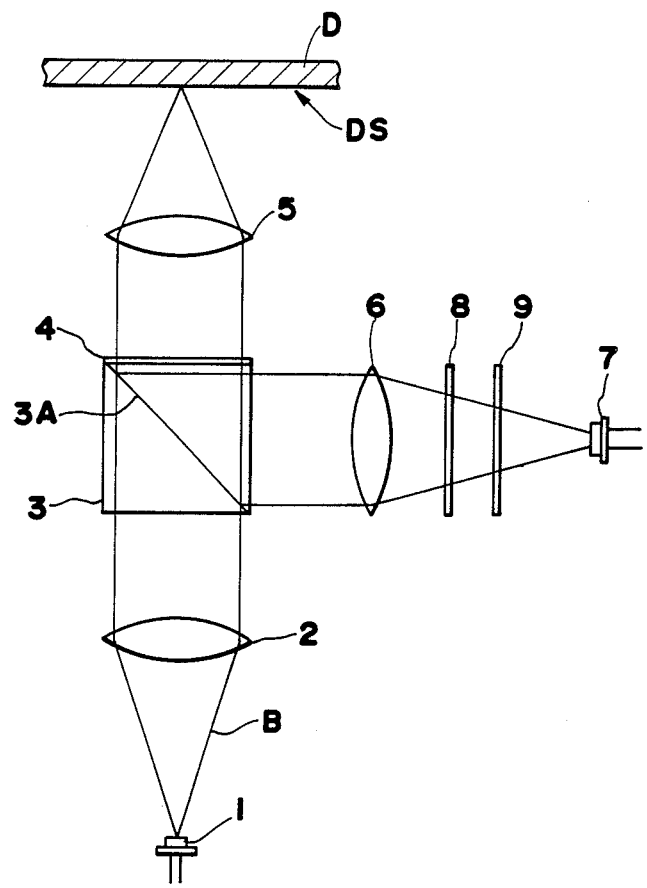
FIG. 1 is a diagram showing the construction of an automatic focusing system as a first embodiment of the invention.

The present invention will be described below with reference to the first to seventh embodiments shown in the drawings.

First Embodiment

FIG. 1 is a diagram showing the construction of an automatic focusing system, i.e., a first embodiment.

A semiconductor laser 1 emits a beam B, which is collimated by a collimator lens 2, impinges on a beam splitter 3 having a polarizing reflection plane 3A inclined at an angle of 45 degrees with the optical axis and passes through the plane 3A, whereupon the beam B passes through a quarter-wave plate 4 and is converged by an objective lens 5 into a spot on the data-bearing surface DS of an optical disc D. Upon reflection from the surface DS, the beam B is converged again by the objective lens 5, passes through the quarter-wave plate 4 and then impinges on the beam splitter 3. The beam B thus passing through the quarter-wave plate 4 twice has its direction of polarization rotated through 90 degrees and is therefore reflected rightward by the reflection plane 3A. The reflected beam B is converged by a converging lens 6 and then passes through a pair of diffraction gratings 8, 9 interposed between the lens 6 and a four-segment photodetector 7. These diffraction gratings each have transparent and nontransparent strips arranged in parallel at a predetermined spacing, and the strips of the grating 9 are disposed as rotated through a small angle α relative to the strips of the grating 8. The distance between the gratings 8 and 9 is set to a Talbot distance L. The Talbot distance is the distance from a grating to a position where a sharp image (Fourier image) of the grating is formed when light of spherical waves with a radius of curvature R and wavelength λ is incident on the grating which has a pitch d and satisfies Equation (X1) given below.

$$1/R + 1/L = \lambda/(n \cdot d^2) \qquad (X1)$$

where n is a natural number. Accordingly, the Talbot distance L is expressed by Equation (X2) below.

$$L = (R \cdot n \cdot d^2)/(R \cdot \lambda - n \cdot d^2) \qquad (X2)$$

Thus, when the grating 8 is positioned at the Talbot distance L from the grating 9, the sharp Fourier image of the grating 8 is superposed on the grating 9 to form a sharp moire pattern. The four-segment photodetector 7 is provided for evaluating the moire pattern and obtaining the data recorded on the surface DS of the optical disc D. A specific method usable of evaluating the moire pattern is disclosed in U.S. Ser. No. 169,420 entitled "Automatic Focusing Apparatus," filed on Mar. 17, 1988.

When the data-bearing surface DS of the disc D is under in-focus condition in the system of FIG. 1, i.e, when the surface DS is positioned at the focal point of the objective lens 5, the beam B incident on the lens 5 as parallel rays converges on the surface DS, and the beam B reflected at the surface DS is made parallel rays by the objective lens 5. On the other hand, when the data-bearing surface DS is positioned closer to the objective lens 5 than its focal point and beyond the focal point, the beam B reflected at the surface DS and passing through the lens 5 becomes divergent rays and convergent rays, respectively. The moiré pattern formed on the four-segment photodetector 7 differs in these three conditions, so that a focusing error is detected from the output of the photodetector 7. A feedback signal is then applied to a voice coil (not shown) for driving the objective lens 5 axially thereof in accordance with the defocused amount of the optical disc, whereby the objective lens 5 is shifted for automatic focusing.

Figure 2C:
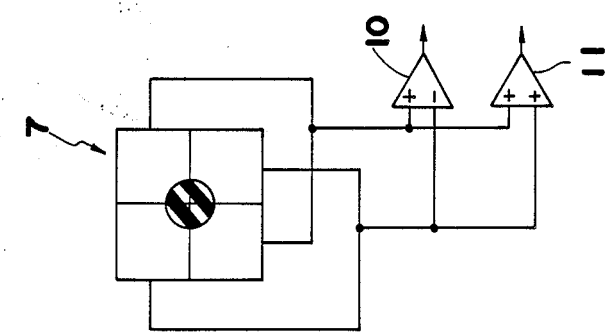
FIGS. 2 (A), 2(B) and 2(C) are diagrams showing a moire pattern formed on the light receiving surface of a four-segment photodetector when the data-bearing surface of an optical disc is located at a position closer to an objective lens than the focal point thereof, at the focal point and beyond the focal point, respectively.
Figure 2B:
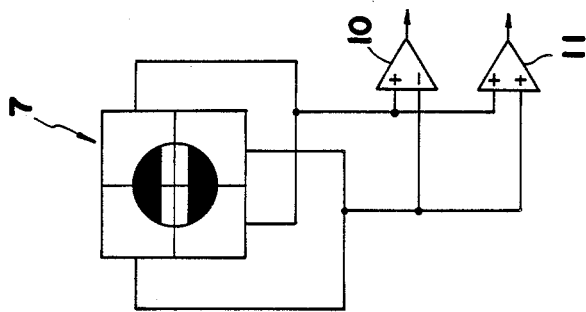
Figure 2A:
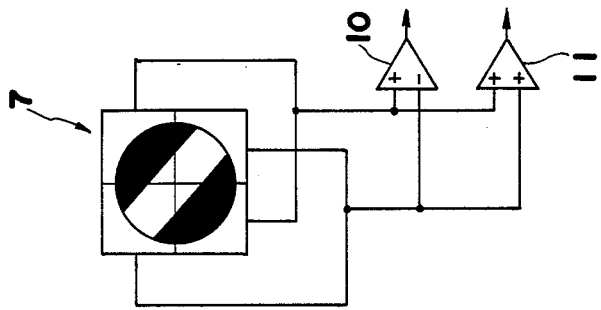

FIGS. 2 (A), (B) and (C) are diagrams showing the moire pattern formed on the light receiving surface of the four-segment photodetector 7 in the case where the data-bearing surface DS of the optical disc D is positioned closer to the objective lens 5 than the focal point thereof, at the focal point and beyond the focal point, respectively. Although the diameter of the beam B is different in these three cases, the beam B is entirely incident on the photodetector 7 in all the cases, which are therefore approximately equal in the amount of incident light, and the amount of incident light is not greatly different between in-focus condition and out-focus condition. FIG. 2 further shows a comparator 10 which is adapted to compare the sum of outputs of the two segments arranged on one diagonal of the four-segment photodetector 7 with the sum of outputs of the two segments on the other diagonal to produce a focusing error signal representing the difference to obtain a focused state. Indicated at 11 is an adder for delivering the sum of outputs of the four segments of the photodetector 7 as a RF (radio frequency) signal to obtain the data recorded on the optical disc D.

Figure 3:
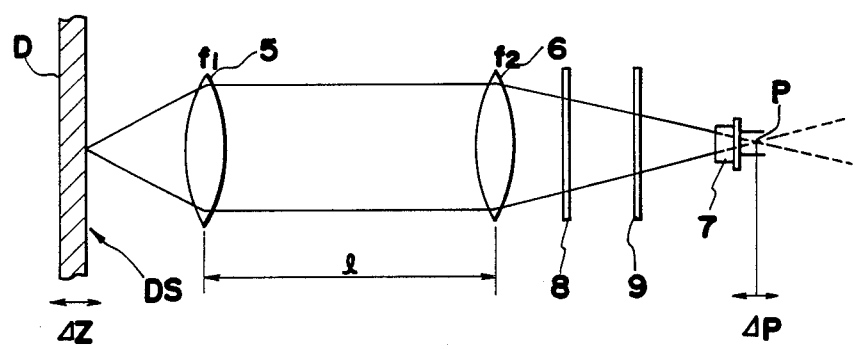
FIG. 3 is a diagram for illustrating the displacement of a beam converging point in the system of FIG. 1.

With the first embodiment, the convex lens 6 is interposed between the beam splitter 3 and the diffraction grating 8 to cause the beam B to entirely impinge on the photodetector 7. More specifically stated with reference to FIG. 3, suppose the displacement of the optical disc D along the optical axis is ΔZ, the focal length of the objective lens 5 is f1, the focal length of the convex lens 6 is f2, and the distance between these two lenses is l. The displacement ΔP of the beam converging point P of the convex lens 6 is then expressed by Equation (X3) below.

$$\Delta P = \frac{f2^2 \cdot \Delta Z}{f1^2 - (l - f1 - f2) \cdot \Delta Z} \qquad (X3)$$

For example, suppose the focal length f1 of the objective lens 5 is 5.0 mm, the focal length f2 of the convex lens 6 is 20.0 mm, and the lens-to-lens distance l is 50.0 mm. The displacement ΔP is then given by:

$$\Delta P = (400 \cdot \Delta Z)/(25 - 25 \cdot \Delta Z)$$

Usually, the maximum value of the displacement ΔZ of the optical disc D is set to about ±50 μm. When ΔZ is ±50 μm, ΔP varies as shown in Table 1. Since f2 is 20.0 mm, the beam converging point P shifts between the position at a distance of 19.24 mm from the convex lens 6 and the position at a distance of 20.84 mm from the lens 6.

Assuming that the four-segment photodetector 7 is positioned at a distance of 15 mm from the convex lens 6 which has an effective diameter of 4 mm, the beam diameter DI on the photodetector 7 as determined by proportional calculation is as listed in Table 1.

TABLE 1

| ΔZ (mm) | ΔP (mm) | DI (mm) |
|---------|---------|---------|
| +0.05   | +0.84   | 1.12    |
| 0       | 0       | 1       |
| −0.05   | −0.76   | 0.88    |

Accordingly, if the photodetector 7 is larger than the size 1.12 mm ×1.12 mm, the beam B will be entirely incident on the photodetector 7.

The converging lens 6 can be any of a double-convex lens, plano-convex lens and positive meniscus lens.

According to the first embodiment described above, the beam B reflected from the data-bearing surface DS of the optical disc D is converged by the converging lens 6 interposed between the beam splitter 3 and the diffraction grating 8, whereby the amount of light incident on the photodetector 7 can be made constant at all times. The converging lens 6 is so positioned that the beam B passes therethrough before impinging on the diffraction gratings 8 and 9. This ensures effective use of the space between the lens 6 and the photodetector 7, consequently making the automatic focusing system compact.

Second Embodiment

Figure 4:
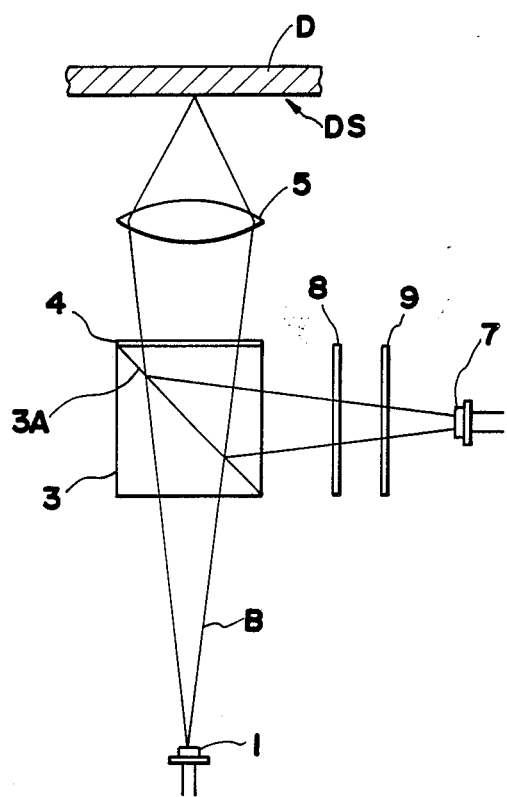
FIG. 4 is a diagram showing the construction of another automatic focusing system as a second embodiment of the invention.

FIG. 4 is a diagram showing the construction of another automatic focusing system, i.e., a second embodiment.

The second embodiment corresponds to the first embodiment from which the collimator lens 2 and the converging lens 6 are omitted, so that only the feature of the second embodiment different from the first will be described.

The beam B emitted by the semiconductor laser 1 impinges as divergent rays on the beam splitter 3 without being collimated and is converged by the objective lens 5 into a spot on the data-bearing surface DS of the optical disc D. Accordingly, the beam B reflected at the data-bearing surface DS is converged again by the objective lens 5, impinges as convergent rays on the beam splitter 3, is reflected at the polarizing reflection plane 3A and passes through the pair of diffraction gratings 8, 9.

With the system of FIG. 4, therefore, the beam B reflected at the data-bearing surface DS and passing through the objective lens 5 becomes convergent rays when the surface DS is at the in-focus position where the beam from the semiconductor laser 1 is focused.

Figure 5:
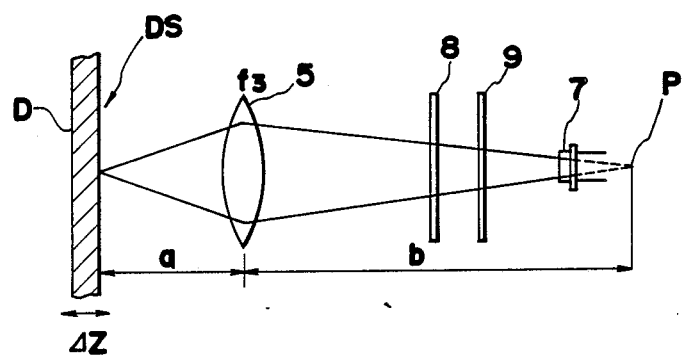
FIG. 5 is a diagram for illustrating the displacement of a beam converging point in the system of FIG. 4.

To described the system more specifically with reference to FIG. 5, it is assumed that the objective lens 5 has a focal length f3 of 5.0 mm as in the case of the first embodiment. In order to satisfy the paraxial condition of the lens $1/f3 = 1/a + 1/b$ when the optical disc D is at the in-focus position, suppose the distance a from the objective lens 5 to the data-bearing surface DS of the disc D is 6 mm, the distance b from the lens 5 to the beam converging point P is 30 mm, the distance from the lens 5 to the four-segment photodetector 7 is 25 mm, and the effective diameter of the lens 5 is 4 mm. The beam diameter DI on the photodetector 7 will then be as listed in Table 2 when computed by proportional calculation.

TABLE 2

| ΔZ (mm) | b (mm) | a (mm) | DI (mm) |
|---|---|---|---|
| +0.05 | 31.32 | 6.05 | 0.81 |
| 0 | 30 | 6 | 0.67 |
| −0.05 | 28.81 | 5.95 | 0.53 |

It therefore follows that if the photodetector 7 is larger than size 0.81 mm ×0.81 mm, the beam B to be received can entirely be incident on the photodetector 7.

According the second embodiment described, the amount of light to be incident on the photodetector 7 can be made constant at all times even in the absence of the converging lens 6 used in the first embodiment. This serves to provide a compacted automatic focusing system.

Third Embodiment

Figure 6:
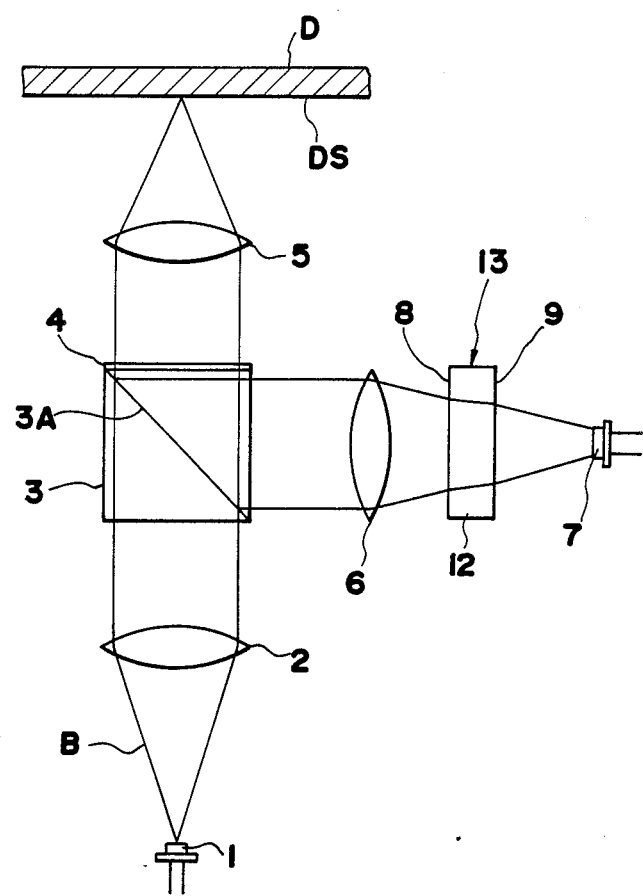
FIG. 6 is a diagram showing the construction of another automatic focusing system as a third embodiment of the invention.

FIG. 6 is a diagram showing the construction of another automatic focusing system, i.e., a third embodiment.

The third embodiment has the same construction as the first except that the two diffraction gratings 8, 9 of the first embodiment are formed on the respective surfaces of a single transparent plate 12 which are parallel to each other, so that the different feature only will be described.

Figure 7:
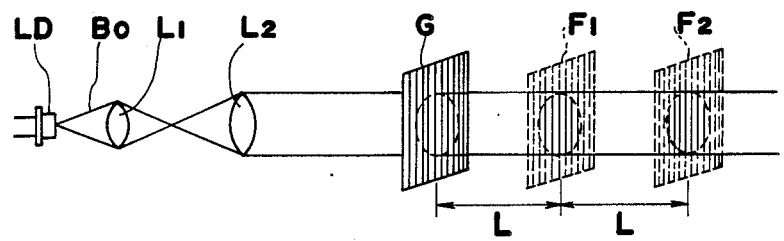
FIG. 7 is a diagram for illustrating a Fourier image.
Figure 8:
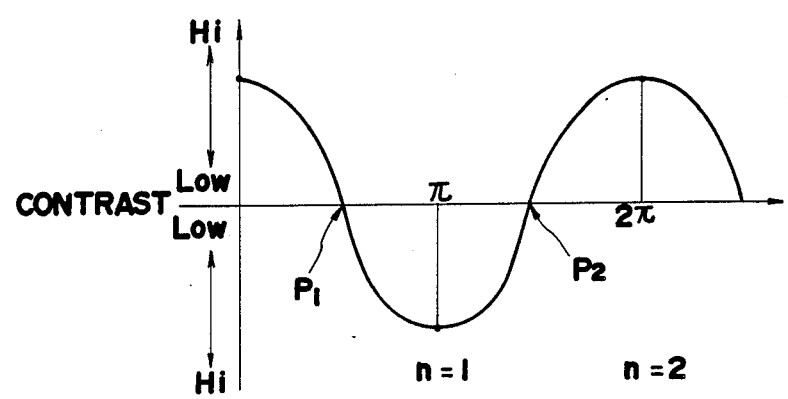
FIG. 8 is a diagram showing variations in the contrast of Fourier image in FIG. 7.

First, the principle on which the Fourier image of the diffraction grating is formed will be described in greater detail with reference to FIG. 7. It is now assumed that the beam B0 emitted by a laser light source LD is converged by a condenser lens L1 and made parallel rays by a collimator lens L2 before impinging on a diffraction grating G. The diffraction grating G has transparent and nontransparent strips arranged in parallel at a predetermined spacing. The beam B0 passes through the grating G and is thereby diffracted, forming images F1 and F2 of the grating G. These images F1 and F2 are termed Fourier images. The first image F1 is formed at the position a Talbot distance L ($=d^2/\lambda$, d: strip pitch of the grating, $\lambda$: wavelength of light) away from the original grating G. The next image F2 is formed to the right of the image F1 in FIG. 7 at the position the Talbot distance L further away from the image F1. Generally, an image of the same pattern as the original grating G is formed at the position which is the Talbot distance L times 2 m (m: a natural number) away from the grating G, i.e., $2m \cdot d^2/\lambda$ away therefrom, and an image of a pattern in black-white reversed relation to the pattern of the grating G is formed at the position the Talbot distance L times (2m +1), i.e. $(2m+1) \cdot d^2/\lambda$, away from the grating G. At a position between these images, an obscure image is formed. Accordingly, the contrast of the image so varies as represented by a sine curve as shown in FIG. 8, with no image formed at the middle positions P1, P2 between the images.

It therefore follows that when another diffraction grating is disposed at the position where the Fourier image of the grating G is formed, the result is equivalent to that achieved by the two gratings as lapped over each other, consequently giving a sharp moire pattern. On the other hand, the second diffraction grating, if not disposed at the position where the Fourier image is formd, fails to produce a contrasty moire pattern.

The foregoing first embodiment wherein the two diffraction gratings 8 and 9 are provided separately is disadvantageous to fabricate since an adjustment is necessary for locating the grating 9 at the position where the Fourier image of the grating 8 is formed. With the third embodiment, the diffraction gratings 8, 9 are provided on the respective surfaces of the single transparent plate 12 which are parallel to each other to thereby ensure a simplied adjustment procedure for the fabrication.

Figure 9:
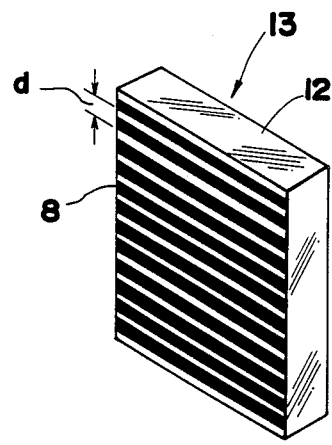
FIGS. 9 (A) and 9(B) are perspective views showing an optical member for forming a moire pattern for use in the system of FIG. 6.
Figure 9:
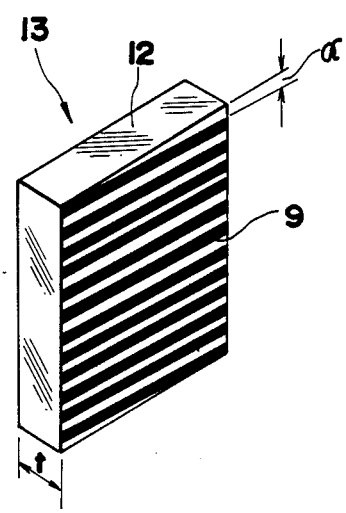

More specifically stated with reference to FIGS. 9 (A) and (B), the plate 12 is planar, t in thickness and made of transparent glass or plastics. One surface of the plate 12 is formed with transparent and nontransparent strips arranged in parallel with a predetermined pitch d to provide the diffraction grating 8, and the other plate surface is similarly provided with the diffraction grating 9. The strips of the grating 9 are formed as rotated through a small angle α relative to the strips of the grating 8. The small angle α is in the range of about 5 degrees to about 15 degrees. To form the moire pattern in this way, the planar plate 12 having the pair of diffraction gratings 8, 9 is provided in the form of an optical member 13, which is interposed between the beam splitter 3 and the four-segment photodetector 7.

In the case where air is present between the gratings 8 and 9, the Talbot distance L is expressed by Equation (X2) already mentioned with reference to the first embodiment, whereas in the case where the plate 12 is made of glass with a refractive index of N, the wavelength of light is λ/N, so that the Talbot distance L is expressed by Equation (X4) given below.

$$L = \frac{R \cdot N \cdot n \cdot d^2}{R \cdot \lambda - N \cdot n \cdot d^2} \quad (X4)$$

Accordingly, a sharp moire pattern can be formed by making the thickness t of the plate 12 equal to the Talbot distance L. When numerically exemplified, the Talbot distance L is 4.14 mm when n = 1, N = 1.5, R = −30×10$^{-3}$ (m), λ = 780×10$^{-9}$ (m), and d = 0.05 (mm).

The third embodiment described above has the same advantage as the first embodiment and another advantage in that the distance between the two diffraction gratings 8, 9 and the angle of inclination, α, need not be adjusted. The system is therefore easy to manufacture.

Fourth Embodiment

With the fourth embodiment, an optical member 13 similar to the one included in the third embodiment for forming the moire pattern serves also as window glass for protecting the four-segment photodetector 7. Accordingly, the different feature, i.e. the structure around the photodetector 7, only will be described.

Figure 10:
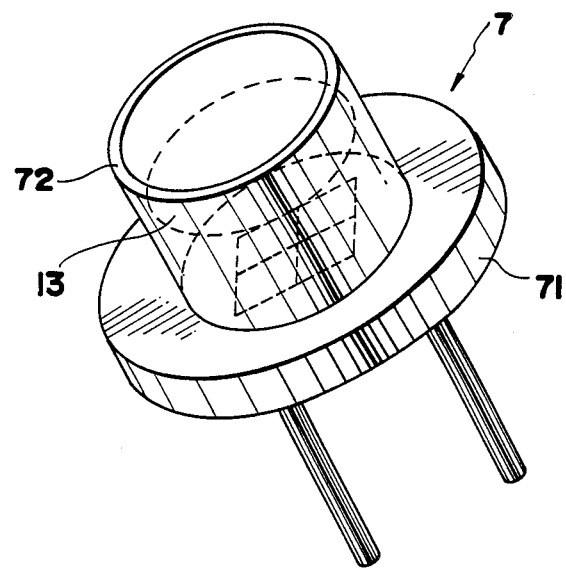
FIG. 10 is a perspective view of an assembly including a four-segment photodetector in another automatic focusing system as a fourth embodiment of the invention.
Figure 11:
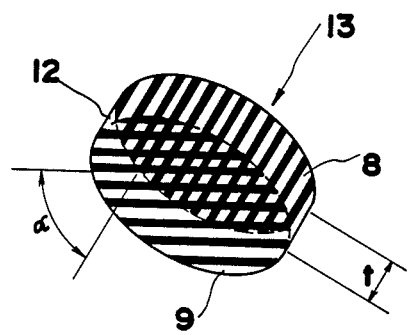
FIG. 11 is a perspective view of an optical member for forming a moire pattern for use in the system of FIG. 10.

With reference to FIG. 10, the photodetector 7 including four light receiving segments has a base plate 71 which is provided with a hollow cylindrical hood member 72 surrounding the four segments. The optical member 13 cut to a circular form as shown in FIG. 11 is provided inside the hood member 72. As already described with reference to the third embodiment, the optical member 13 comprises a planar plate 12 made of transparent glass or plastics and provided with diffraction gratings 8, 9 on the respective surfaces.

Thus, the fourth embodiment, which has the same advantages as the third embodiment, can be fabricated with a reduced number of parts since the moire pattern forming optical member 13 serves also to protect the four-segment photodetector 7. It is therefore possible to provide an automatic focusing system of further reduced size and weight. The optical member 13 can be prepared in a circular form as in the present embodiment by making a large optical member 13 first and then cutting the member to the desired size. This permits quantity production at a reduced cost.

Fifth Embodiment

Figure 12:
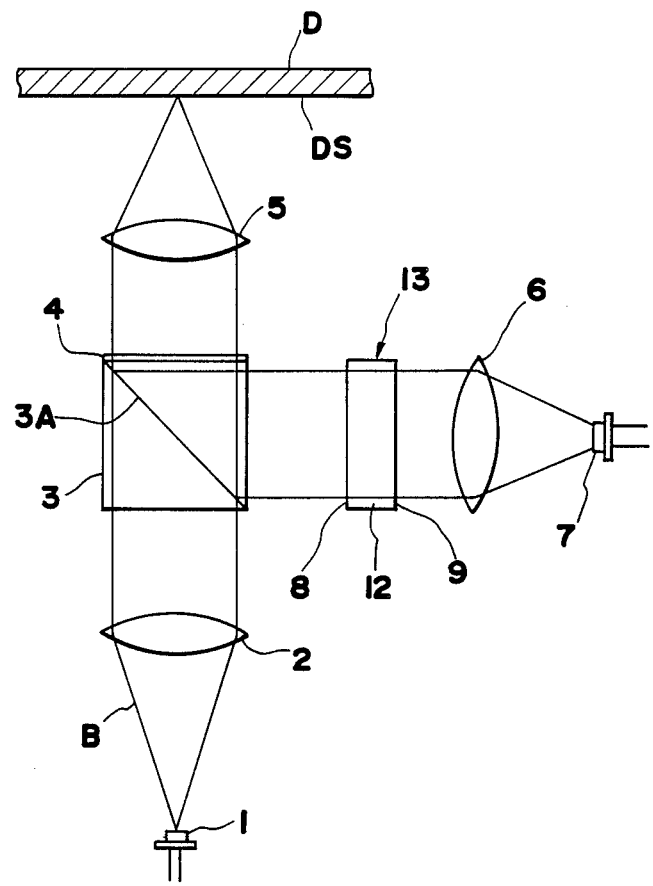
FIG. 12 is a diagram showing the construction of another automatic focusing system as a fifth embodiment of the invention.

FIG. 12 is a diagram showing the construction of another automatic focusing system, i.e., a fifth embodiment.

The fifth embodiment has the same construction as the third except that the converging lens 6 which is disposed in front of the optical member 13 in the third embodiment is positioned in the rear of the optical member 13 in the fifth embodiment. Accordingly, the different feature only will be described.

With the system of FIG. 12, the beam B reflected at the data-bearing surface DS of the optical disc D is converged by the objective lens 5, reflected at the polarizing reflection plane 3A and then passes through the optical member 13. As already described for the third embodiment, the optical member 13 comprises a planar plate 12 of transparent glass or plastics formed with diffraction gratings 8, 9 on the respective surfaces thereof so as to form a moire pattern. The moire pattern formed by the optical member 13 is projected on the four-segment photodetector 7 by the converging lens 6 interposed between the optical member 13 and the photodetector 7.

When the data-bearing surface DS of the optical disc D is at in-focus position, i.e., at the position of the focal point of the objective lens 5, the beam B reflected from the surface DS is made parallel rays by the lens 5. Accordingly, the beam B incident on the optical member 13 is in the form of parallel rays. Equation (X4) then becomes Equation (X5) below since the radius of curvature of the waves, R = ∞.

$$L = (N \cdot n \cdot d^2)/\lambda \quad (X5)$$

When numerically exemplified specifically, the Talbot distance L is 4.81 mm in the case where n = 1, N = 1.5, λ = 780×10$^{-9}$ (m), and d = 0.05 (mm).

The converging lens 6 can be any of a double-convex lens, plano-convex lens and positive meniscus lens.

Although the fifth embodiment described is not adapted to advantageously utilize the space between the converging lens 6 and the photodetector 7 unlike the foregoing first to fourth embodiments, the fifth embodiment, like the third embodiment, has the advantage that the distance between the two diffraction gratings 8, 9 and the angle of inclination, α, need not be adjusted, hence a simplified manufacturing process.

Sixth Embodiment

Figure 13:
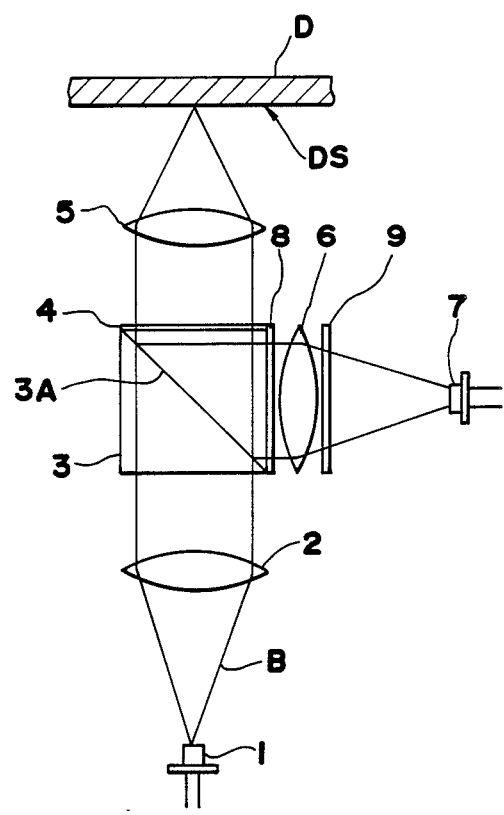
FIG. 13 is a diagram showing the construction of another automatic focusing system as a sixth embodiment of the invention.

FIG. 13 is a diagram showing the construction of another automatic focusing system, i.e., a sixth embodiment.

The sixth embodiment has the same construction as the first except that the converging lens 6, which is disposed in front of the diffraction gratings 8, 9 in the first embodiment, is interposed between the gratings 8, 9 with the sixth embodiment, so that the different feature only will be described.

In the system of FIG. 13, the beam B reflected from the data-bearing surface DS of the optical disc D is converged by the objective lens 5 and reflected at the polarizing reflection plane 3A and then passes through the diffraction grating 8, whereupon the beam B as converged by the converging lens 6 reaches the diffraction grating 9. Upon passage through the grating 9, the beam B forms a moire pattern on the four-segment photodetector 7.

Figure 14:
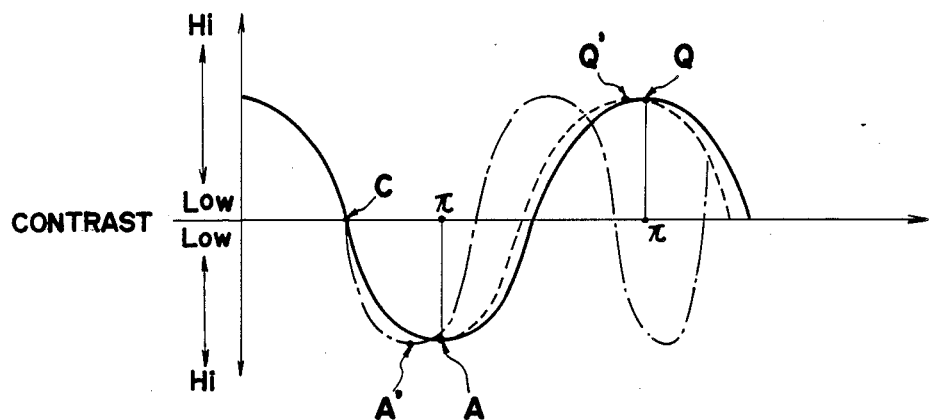
FIG. 14 is a diagram showing variations in the contrast of a Fourier image as related to the position of a converging lens in the system of FIG. 13.

Now with reference to FIG. 14, the position where the Fourier image is formed will be described in the case where the converging lens 6 is disposed behind the diffraction grating 8. In this case, the Fourier image of the diffraction grating 8 is formed at a position closer to the grating 8 owing to the action of the converging lens 6, with the result that the image contrast variation curve has a shortened period. FIG. 14, the solid line represents the contrast variation in the absence of the converging lens as described with reference to FIG. 8, i.e., in the case where the beam is in the form of parallel rays, while if the converging lens 6 is disposed at the position A in FIG. 14, the contrast variation is altered as represented by the broken line owing to the action of the lens 6. Consequently, the position of the Fourier image alters from Q to Q'. Assuming that the focal length of the converging lens 6 is f4, there is the relationship of Equation (X6) in this case since R = −f4 in Equation (X1).

$$-1/f4 + 1/L = \lambda/(n \cdot d^2) \tag{X6}$$

Accordingly, the position where the Fourier image is formed, as expressed in terms of Talbot distance L, is given by Equation (X7) below.

$$L = (f4 \cdot n \cdot d^2)/(f4 \cdot \lambda + n \cdot d^2) \tag{X7}$$

Consequently, subsituting n = 1 in Equation (X7), the position Q' where the first Fourier image is formed behind the converging lens 6 disposed at the position A is given by:

$$L = (f4 \cdot d^2)/(f4 \cdot \lambda + d^2) \tag{X8}$$

A clear moire pattern can therefore be obtained by disposing the lens 6 at the position A which is away from the grating 8 by the distance $d^2/\lambda$, and the grating at the position Q' which is away from the lens 6 by the distance $(f4 \cdot d^2)/(f4 \cdot \lambda + d^2)$.

Incidentally, depending on the thickness of the lens 6 to be inserted between the gratings 8, 9, the spacing between the grating 8 and the lens 9 may be set to $(k \cdot d^2/\lambda)$, and the spacing between the lens 6 and the grating 9 may be set to $(f4 \cdot n \cdot d^2)/(f4 \cdot \lambda + n \cdot d^2)$ (k and n being each a natural number).

The converging lens 6 need not always be disposed at the position A but can be located at any desired position between the two gratings 8, 9. For example, the converging lens 6, if located at the position C in FIG. 14, alters the contrast variation as represented by the dot-and-dash line. This shifts the Fourier image from A to A', so that the grating 9 is to be disposed at this position A'.

The converging lens 6 can be any of a double-convex lens, plano-convex lens and positive meniscus lens.

To provide a compacted system of the construction shown in FIG. 13, the diffraction grating 8 is formed as joined to the beam emanating surface of the beam splitter 3.

With the sixth embodiment described above, the beam B reflected from the data-bearing surface DS of the optical disc D is converged by the converging lens 6 interposed between the two diffraction gratings 8, 9, with the result that the amount of light incident on the photodetector 7 can be made constant at all times as in the first embodiment. With the converging lens 6 so positioned that the beam B passing therethrough impinges on the grating 9, the space between the lens 6 and the photodetector 7 can be utilized advantageously to make the automatic focusing system compact.

Seventh Embodiment

Figure 15:
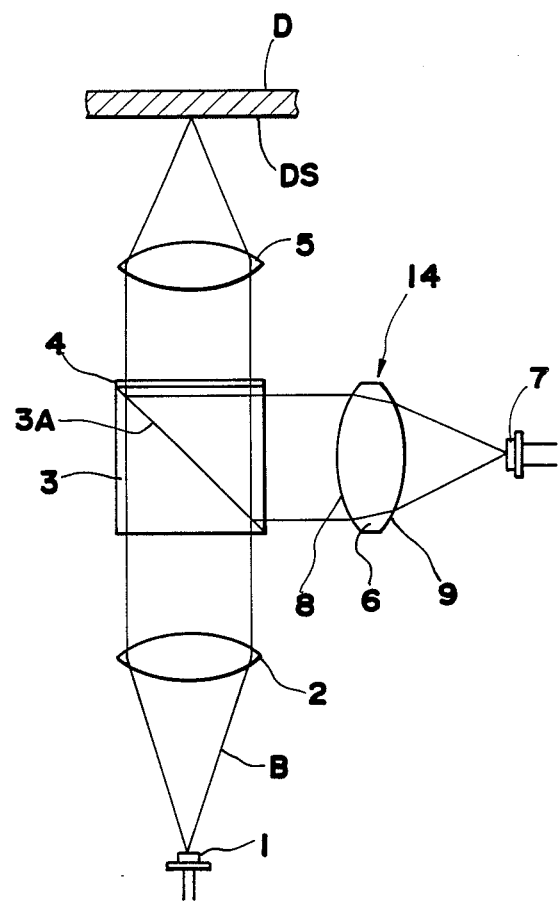
FIG. 15 is a diagram showing the construction of another automatic focusing system as a seventh embodiment of the invention.

FIG. 15 is a diagram showing the construction of another automatic focusing system as a seventh embodiment.

The seventh embodiment has the same construction as the sixth except that the two diffraction gratings 8, 9 of the sixth embodiment are provided on the respective surfaces of the converging lens 6, so that the different feature only will be described.

With the sixth embodiment described, the two diffraction gratings 8, 9 are provided separately and therefore require an adjustment for disposing the grating 9 at the position where the Fourier image of the grating 8 is formed. The system is therefore disadvantageous to manufacture, whereas with the seventh embodiment, the diffraction gratings 8, 9 are formed on the respective opposite surfaces of the converging lens 6 to simplify the adjustment procedure needed for the manufacture.

Figure 16:
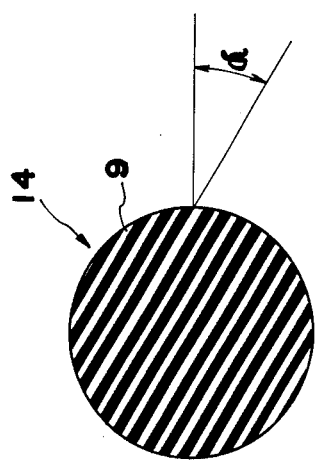
FIGS. 16 (A) 16(B) and 16(C) are a left side elevation, front view and a right side elevation, respectively, showing an optical member for forming a moire pattern in the system of FIG. 15.
Figure 16:
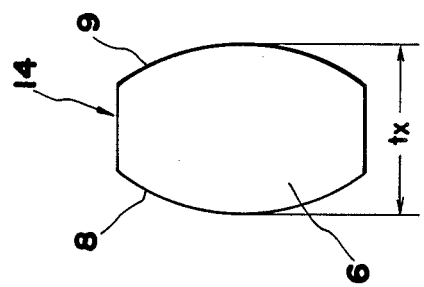
Figure 16:
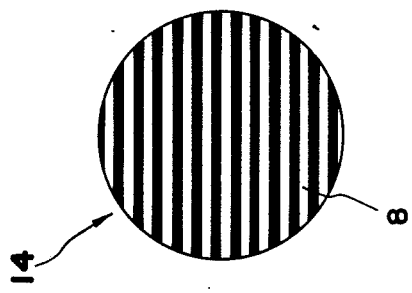

More specifically stated with reference to FIGS. 16 (A), (B) and (C), one surface of the lens 6, which is tx in thickness and made of glass or plastics, is formed with transparent and nontransparent strips to provide the diffraction grating 8, and the other lens surface is similarly provided with the diffraction grating 9. The strips of the gratings 8 and 9 are arranged in parallel at a predetermined spacing when the lens 6 is seen face-to-face. The strips of the grating 9 are formed as rotated through a small angle α relative to those of the grating 8. This small angle α is in the range of about 5 degrees to about 15 degrees. For the gratings to form a moire pattern, the lens 6 having the pair of the gratings 8, 9 as joined thereto is provided in the form of an optical member 14, which is interposed between the beam splitter 3 and the four-segment photodetector 7.

The thickness tx of the lens 6 is set equal to the Talbot distance L as is the case with the thickness of the planar plate 12 of the third embodiment already described. Assuming that the reffractive index of the lens is Nx, the wavelength of light is λ/Nx, so that Equation (X6) becomes Equation (X9) below in this case.

$$-1/f4 + 1/L = \lambda/(Nx \cdot n \cdot d^2) \tag{X9}$$

Accordingly, the Talbot distance L in this case is equivalently expressed by Equation (X10) given below.

$$L = (f4 \cdot Nx \cdot n \cdot d^2)/(f4 \cdot \lambda + Nx \cdot n \cdot d^2) \tag{X10}$$

The converging lens 6 can be any of a double-convex lens, plano-convex lens and positive meniscus lens.

The seventh embodiment described has the same advantages as the sixth embodiment and is further easy to manufacture since the distance between the two diffraction gratings 8, 9 and the angle of inclination, α, need not be adjusted. The system can be composed of a reduced number of parts and made more compacted.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An automatic focusing system, comprising:
   a laser beam source;
   an objective lens for focusing a laser beam produced from the laser beam source so as to form a spot on an image subjecting face;
   photodetector means for detecting a focusing error;
   a beam splitter disposed between the laser beam source and the objective lens so that the laser beam produced from the laser beam source travels to the image subjecting face through the objective lens while the laser beam reflected off the image subjecting face back through the objective lens travels to the photodetector means;
   a pair of diffraction gratings disposed between the beam splitter and the photodetector means so as to form a moiré pattern on the photodetector means; and a converging lens disposed between the beam splitter and the diffraction gratings;

wherein the laser beam is converged by the converging lens and then passes through the two diffraction gratings.

2. An automatic focusing system as claimed in claim 1, wherein the distance between the two diffraction gratings is set to the Talbot distance.

3. An automatic focusing system, comprising:

a laser beam source;

an objective lens for focusing a laser beam produced from the laser beam source so as to form a spot on an image subjecting face;

photodetector means for detecting a focusing error;

a beam splitter disposed between the laser beam source and the objective lens so that the laser beam produced from the laser beam source travels to the image subjecting face through the objective lens while the laser beam reflected off the image subjecting face back through the objective lens travels to the photodetector means; and an optical member disposed between the beam splitter and the photodetector means so as to form a moiré pattern on the photodetector means, the member including a transparent base plate and a pair of diffraction gratings provided on the respective surfaces of the plate.

4. An automatic focusing system as claimed in claim 3, wherein the thickness of the transparent base plate is equal to the Talbot distance.

5. An automatic focusing system as claimed in claim 3, further comprising a converging lens disposed between the beam splitter and the optical member.

6. An automatic focusing system as claimed in claim 3, further comprising a converging lens disposed between the optical member and the photodetector means.

7. An automatic focusing system as claimed in claim 3, wherein the optical member is arranged to cover the photodetector means.

8. An automatic focusing system, comprising:

a laser beam source;

an objective lens for focusing a laser beam produced from the laser beam source so as to form a spot on an image subjecting face;

photodetector means for detecting a focusing error;

a beam splitter disposed between the laser beam source and the objective lens so that the laser beam produced from the laser beam source travels to the image subjecting face through the objective lens while the laser beam reflected off the image subjecting face back through the objective lens travels to the photodetector means;

a pair of diffraction gratings disposed between the beam splitter and the photodetector means so as to form a moiré pattern on the photodetector means; and a converging lens disposed between the two diffraction gratings;

wherein the laser beam having passed through one of the diffraction gratings is converged by the converging lens and then passes through the other diffraction grating.

9. An automatic focusing system as claimed in claim 8, wherein the distance between the two diffraction gratings is set to the Talbot distance.

10. An automatic focusing system as claimed in claim 8, wherein the two diffraction gratings are provided on the respective surfaces of the converging lens.

11. An automatic focusing method comprising the steps of:

focusing a laser beam by an objective lens so as to form a spot on an image subjecting face;

transmitting the laser beam reflected off the image subjecting face back through the objective lens to a photodetector;

providing a pair of diffraction gratings before the photodetector so as to form a moiré pattern thereon;

providing the converged laser beam to the two diffraction gratings at an in-focus condition; and detecting a focusing error in response to output of the photodetector.

* * * * *